(12) United States Patent
Syrjärinne et al.

(10) Patent No.: US 9,151,844 B2
(45) Date of Patent: Oct. 6, 2015

(54) ACCURATE GNSS TIME HANDLING IN DUAL/MULTI-SIM TERMINALS

(75) Inventors: Jari Tapani Syrjärinne, Tampere (FI); Jens Christian Schwarzer, Copenhagen S (DK)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 13/580,139

(22) PCT Filed: Feb. 22, 2010

(86) PCT No.: PCT/IB2010/050772
§ 371 (c)(1),
(2), (4) Date: Aug. 20, 2012

(87) PCT Pub. No.: WO2011/101709
PCT Pub. Date: Aug. 25, 2011

(65) Prior Publication Data
US 2012/0315896 A1 Dec. 13, 2012

(51) Int. Cl.
H04W 36/00 (2009.01)
G01S 19/25 (2010.01)
G01S 19/05 (2010.01)
H04W 64/00 (2009.01)

(52) U.S. Cl.
CPC .............. *G01S 19/256* (2013.01); *G01S 19/05* (2013.01); *G01S 19/25* (2013.01); *H04W 64/00* (2013.01)

(58) Field of Classification Search
CPC ...... G01S 19/25; H04W 56/00; H04W 36/00; H04W 64/00
See application file for complete search history.

(56) References Cited

U.S. PATENT DOCUMENTS

| 6,748,202 B2 | 6/2004 | Syrjarinne et al. |
| 2006/0234724 A1 | 10/2006 | Syrjarinne et al. |
| 2007/0161385 A1 | 7/2007 | Anderson |
| 2008/0111737 A1 | 5/2008 | Haverkamp et al. |
| 2008/0169979 A1 | 7/2008 | De Salas |
| 2009/0054075 A1 | 2/2009 | Boejer et al. |
| 2009/0156257 A1 | 6/2009 | Shi |
| 2009/0231189 A1 | 9/2009 | Reddy et al. |
| 2009/0253440 A1 | 10/2009 | Edge |
| 2009/0312020 A1 | 12/2009 | Lee |

FOREIGN PATENT DOCUMENTS

| CN | 101312584 A | 11/2008 |
| CN | 101502134 A | 8/2009 |

(Continued)

OTHER PUBLICATIONS

"User Plane Location Protocol", Candidate Version 2.0, Open Mobile Alliance, OMA-TS-ULP-V2_0-20091208-C, Dec. 8, 2009, pp. 1-407.

(Continued)

*Primary Examiner* — Charles Appiah
*Assistant Examiner* — Edward Zhang
(74) *Attorney, Agent, or Firm* — Locke Lord LLP

(57) ABSTRACT

Method, apparatus, and computer program product example embodiments are disclosed for improving the speed and sensitivity of position determination by wireless communication devices using assisted Global Navigation Satellite Systems (A-GNSS). Example embodiments include multi-SIM mobile wireless devices having an A-GNSS location detection capability, with one or more RF modems that may communicate with one or more wireless carriers.

12 Claims, 11 Drawing Sheets

(56) References Cited

FOREIGN PATENT DOCUMENTS

| EP | 1099955 A2 | 5/2001 |
|---|---|---|
| GB | 2336507 A | 10/1999 |
| JP | 2002221565 | 8/2002 |

OTHER PUBLICATIONS

International Search Report and Written Opinion received for corresponding International Patent Application No. PCT/IB2010/050772, dated Dec. 1, 2010, 16 pages.

Office action received for corresponding Chinese Patent Application No. 201080064522.8, dated Jun. 3, 2014, 5 pages of Office Action and No English Language Translation available.

Extended European Search Report received for corresponding European Patent Application No. 10846026.2, dated Jun. 20, 2014, 5 pages.

Office action received for corresponding Chinese Patent Application No. 201080064522.8, dated Sep. 17, 2013, 6 pages of Office Action, No English Language Translation available.

Extended European Search Report for Application No. 15150751.4-1812 dated May 19, 2015.

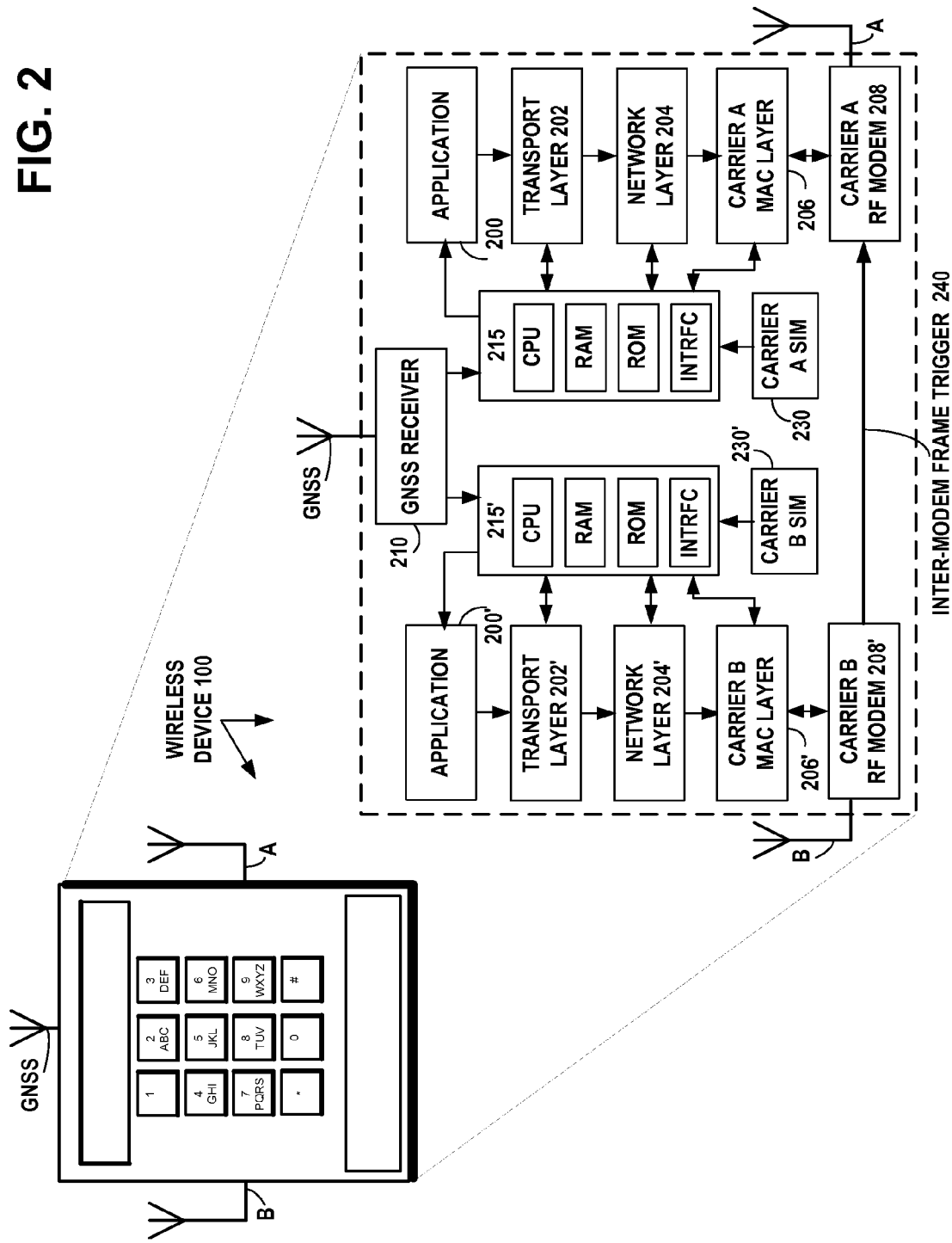

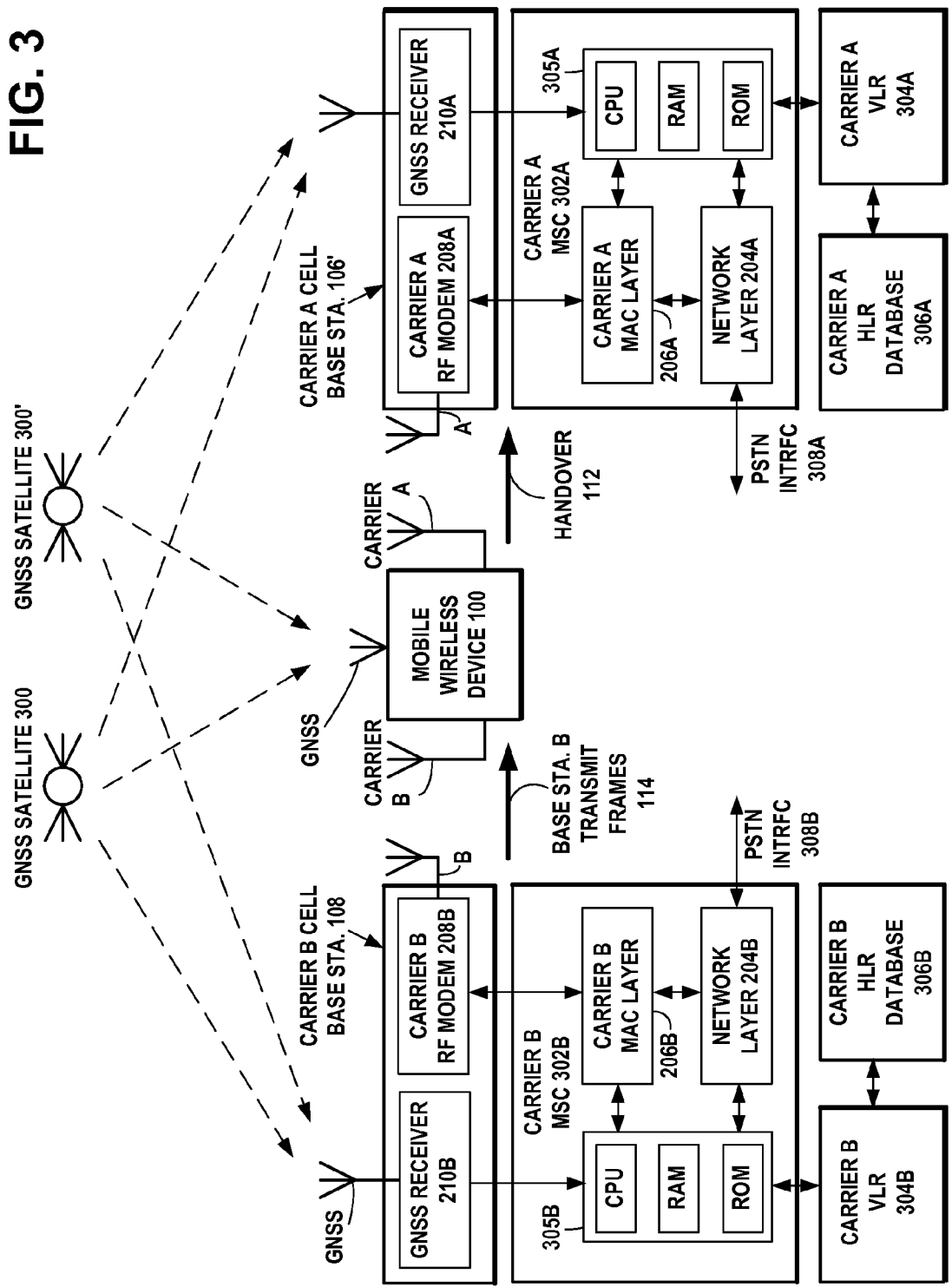

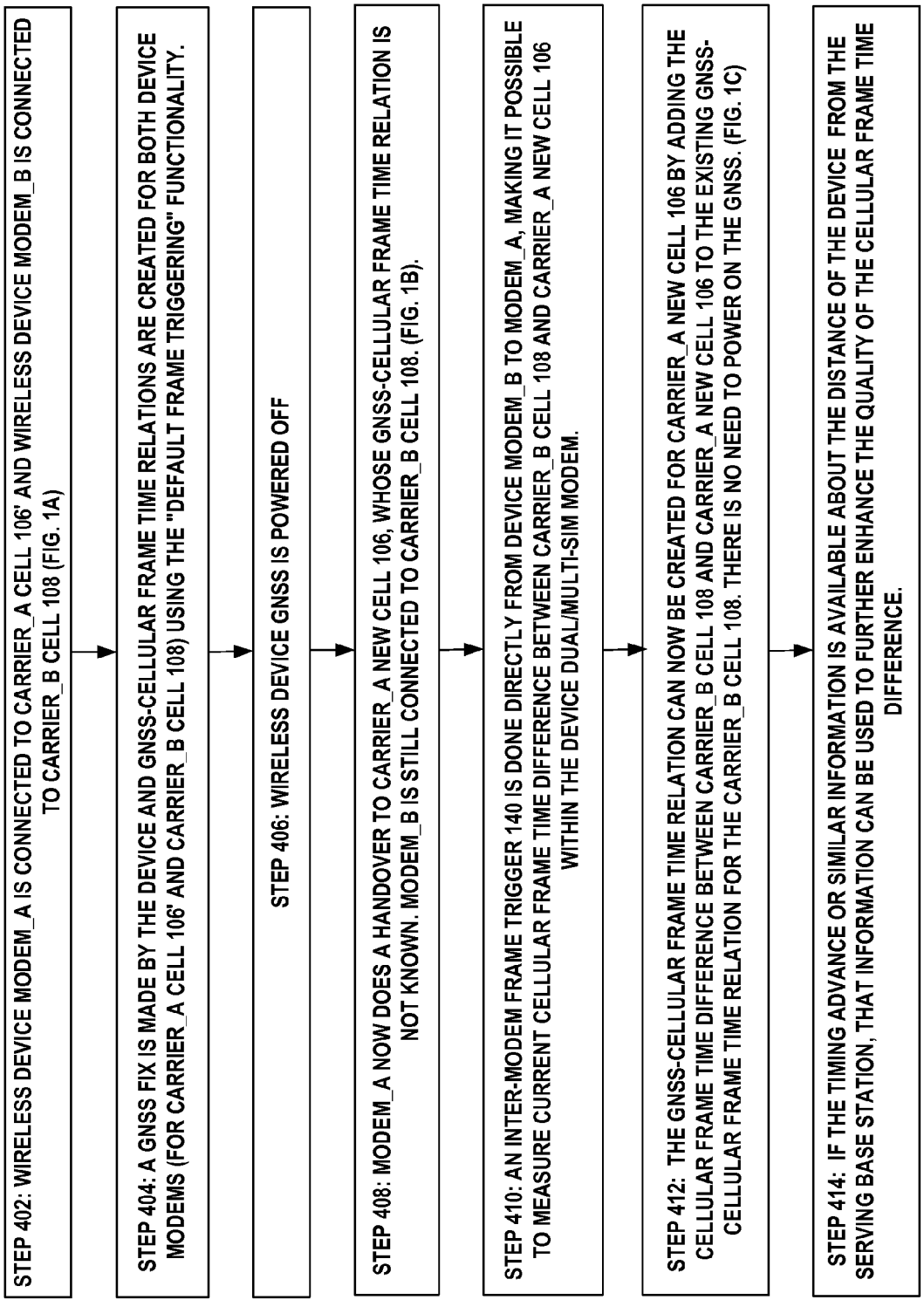

STEPS 402 TO 408 ARE THE SAME AS IN FIGURE 4A, WITH WIRELESS DEVICE MODEM_A DOING A HANDOVER TO CARRIER_A NEW CELL 106,

↓

STEP 422: WIRELESS DEVICE GNSS IS POWERED ON.

↓

STEP 424: WIRELESS DEVICE MODEM_A AND MODEM_B ARE BOTH COMMANDED TO EXECUTE FRAME TRIGGERING TOWARDS THE GNSS RECEIVER. FRAME TRIGGERING FROM THE BOTH MODEMS SHOULD HAPPEN AS SIMULTANEOUSLY AS POSSIBLE TO MINIMIZE THE CRYSTAL OSCILLATOR DRIFT.

↓

STEP 426: THE CELLULAR FRAME TIME DIFFERENCE BETWEEN CARRIER_B CELL 108 AND CARRIER_A NEW CELL 106 IS MEASURED FROM THE TIME DIFFERENCE BETWEEN THE HARDWARE PULSES RECEIVED AT THE DEVICE GNSS RECEIVER. NO GNSS FIXES ARE REQUIRED.

↓

STEP 428: THE GNSS -CELLULAR FRAME TIME RELATION CAN NOW BE CREATED FOR CARRIER_A NEW CELL 106 BY ADDING THE MEASURED CELLULAR FRAME TIME DIFFERENCE BETWEEN CARRIER_B CELL 108 AND CARRIER_A NEW CELL 106 TO THE EXISTING GNSS-CELLULAR FRAME TIME RELATION FOR THE CARRIER_B CELL 108. IF THE TIMING ADVANCE OR SIMILAR INFO IS AVAILABLE ABOUT THE DISTANCE OF THE DEVICE FROM THE SERVING BASE STATION, THAT INFORMATION CAN BE USED TO FURTHER ENHANCE THE QUALITY OF THE CELLULAR FRAME TIME DIFFERENCE.

↓

STEP 430: WIRELESS DEVICE GNSS IS POWERED OFF.

STEP 472: RECEIVING FIRST ASSISTED GLOBAL NAVIGATION SATELLITE SYSTEM WIRELESS SIGNALS BY AT LEAST ONE RF MODEM FROM A FIRST WIRELESS CARRIER USING A FIRST SIM MODULE

STEP 474: RECEIVING SECOND ASSISTED GLOBAL NAVIGATION SATELLITE SYSTEM WIRELESS SIGNALS BY THE AT LEAST ONE RF MODEM FROM A SECOND WIRELESS CARRIER USING A SECOND SIM MODULE;

STEP 476: CAUSING THE AT LEAST ONE RF MODULE TO PERIODICALLY SWITCH BETWEEN USING THE FIRST SIM MODULE AND USING THE SECOND SIM MODULE TO PERIODICALLY SWITCH BETWEEN RECEIVING FIRST ASSISTED GLOBAL NAVIGATION SATELLITE SYSTEM WIRELESS SIGNALS FROM THE FIRST CARRIER OR RECEIVING SECOND ASSISTED GLOBAL NAVIGATION SATELLITE SYSTEM WIRELESS SIGNALS FROM THE SECOND CARRIER.

ACCURATE GNSS TIME HANDLING IN DUAL/MULTI-SIM TERMINALS

RELATED APPLICATION

This application was originally filed as PCT Application No. PCT/IB2010/050772 filed Feb. 22, 2010.

FIELD

The technical field relates to geographical location determination for wireless communications devices. More particularly, the technical field relates to improving the speed and sensitivity of position determination by wireless communication devices using assisted Global Navigation Satellite Systems (A-GNSS).

BACKGROUND

Global Navigation Satellite Systems (GNSS) is a collective term covering various types of satellite navigation technologies, such as the Global Positioning System (GPS), the European Galileo and the Russian GLONASS. Assisted-GNSS (A-GNSS) enables faster position determination in a mobile wireless device than can be obtained using only the broadcast GNSS satellite data, by providing assistance data from the wireless network, such as ephemeris data, clock corrections, and reference locations. The A-GNSS technology has been standardized in the Open Mobile Alliance (OMA) standard: *Open Mobile Alliance, User Plane Location Protocol Candidate Version* SUPL2.0: OMA-TS-ULP-V2_0-20091208-C, December 2009.

The Third Generation Partnership Project (3GPP) defines A-GNSS positioning protocols for GERAN (GSM EDGE Radio Access Network), UTRAN (UMTS Terrestrial RAN), E-UTRAN (Enhanced UTRAN) or LTE (Long-Term Evolution), and CDMA (Code Division Multiple Access) networks. The assistance may include the navigation model (orbit and clock parameters), reference location and reference time. In an assisted situation, the receiver does not need to download the navigation model from the satellites, but receives it over the cellular network to significantly reduce the time to first fix and enable accurate positioning in adverse signal conditions.

SUMMARY

Method, apparatus, and computer program product example embodiments of the invention are disclosed for improving the speed and sensitivity of position determination by wireless communication devices using assisted Global Navigation Satellite Systems (A-GNSS).

Example embodiments of the invention may include a wireless communications device that may have the following components.

At least a first SIM module is configured to access a first wireless carrier and a second SIM module configured to access a second wireless carrier.

At least a first RF modem is configured to communicate with the first wireless carrier and a second RF modem configured to communicate with the second wireless carrier.

At least one global navigation satellite system receiver is included.

At least one processor is included.

At least one memory including computer program code is included.

The at least one memory and the computer program code configured to, with the at least one processor, cause the apparatus at least to:

Compute a reference global navigation satellite system-cellular frame time relation between received satellite signals and cellular frame signals received by the second RF modem from a base station of a second cellular carrier.

Cause a handover to be performed from the first base station to a second base station of the first cellular carrier.

Cause an inter-modem frame trigger to be sent from the second RF modem to the first RF modem, to synchronize the first RF modem with the cellular frame signals received from the base station of the second cellular carrier.

Compute a current global navigation satellite system-cellular frame time relation between the received satellite signals and cellular frame signals received by the first RF modem from the second base station of the first cellular carrier by computing a cellular frame time difference between the base station of the second cellular carrier and the second base station of the first cellular carrier, and adding that difference to the reference frame time relation of the received satellite signals with the base station of the second cellular carrier.

Determine position using the received satellite signals and the cellular frame signals received by the first RF modem from the second base station of the first cellular carrier, based on the computed current global navigation satellite system-cellular frame time relation.

Example embodiments of the method of the invention may further include the following steps:

Computing a reference global navigation satellite system-cellular frame time relation between received satellite signals and cellular frame signals received by a second RF modem from a base station of a second cellular carrier.

Performing a handover from a first base station to a second base station of a first cellular carrier.

Sending an inter-modem frame trigger from the second RF modem to a first RF modem, to synchronize the first RF modem with the cellular frame signals received from the base station of the second cellular carrier.

Computing a current global navigation satellite system-cellular frame time relation between the received satellite signals and cellular frame signals received by the first RF modem from the second base station of the first cellular carrier by computing a cellular frame time difference between the base station of the second cellular carrier and the second base station of the first cellular carrier, and adding that difference to the reference frame time relation of the received satellite signals with the base station of the second cellular carrier.

Determining position using the received satellite signals and the cellular frame signals received by the first RF modem from the second base station of the first cellular carrier, based on the computed current global navigation satellite system-cellular frame time relation.

Example embodiments of the invention may include a wireless communications device that may have two or more SIM modules and a single RF modem, having the following components.

at least a first SIM module configured to access a first wireless carrier and a second SIM module configured to access a second wireless carrier;

at least one RF modem configured to communicate with the first and second wireless carriers;

at least one global navigation satellite system (GNSS) receiver;

at least one processor;

at least one memory including computer program code;

the at least one memory and the computer program code configured to, with the at least one processor, cause the apparatus at least to:

cause first assisted GNSS wireless signals to be received by the at least one RF modem from the first wireless carrier using the first SIM module;

cause second assisted GNSS wireless signals to be received by the at least one RF modem from the second wireless carrier using the second SIM module; and cause the at least one RF module to periodically switch between using the first SIM module and using the second SIM module to periodically switch between receiving first assisted GNSS wireless signals from the first carrier or receiving second assisted GNSS wireless signals from the second carrier.

Example embodiments of the method of the invention for a wireless communications device that may have two or more SIM modules and a single RF modem, may further include the following steps:

receiving first assisted global navigation satellite system wireless signals by at least one RF modem from a first wireless carrier using a first SIM module;

receiving second assisted global navigation satellite system wireless signals by the at least one RF modem from a second wireless carrier using a second SIM module; and causing the at least one RF module to periodically switch between using the first SIM module and using the second SIM module to periodically switch between receiving first assisted global navigation satellite system wireless signals from the first carrier or receiving second assisted global navigation satellite system wireless signals from the second carrier.

Example embodiments of the invention may include a computer readable medium storing program instructions, which when executed by a computer processor, perform the steps of the above recited methods.

The resulting embodiments improve the speed and sensitivity of position determination by wireless communication devices using assisted Global Navigation Satellite Systems (A-GNSS).

DESCRIPTION OF THE FIGURES

A more complete understanding of the example embodiments of the invention is made with reference to the following figures.

FIG. 2 illustrates a functional block diagram of an example embodiment of the wireless device, showing the GNSS receiver and multi-SIM modem architecture.

FIG. 3 illustrates a functional block diagram of an example embodiment of the second carrier's base station providing cellular transmit frames to the wireless device to establish a time reference to measure the current cellular frame time difference between the first carrier's second base station and the second carrier's base station.

FIG. 4A illustrates a flow diagram of an example embodiment of the process to measure the current cellular frame time difference between the first carrier's second base station and the second carrier's base station.

FIG. 4B illustrates a flow diagram of an example embodiment of the process to execute frame triggering by the GNSS receiver for both modems.

FIG. 4D is an example flow diagram illustrating the operation of the multi-SIM mobile wireless device with a single RF modem of FIG. 6.

DISCUSSION OF EXAMPLE EMBODIMENTS OF THE INVENTION

Method, apparatus, and computer program product example embodiments of the invention are disclosed for improving the speed and sensitivity of position determination by wireless communication devices using assisted Global Navigation Satellite Systems (A-GNSS).

Figure 1A:
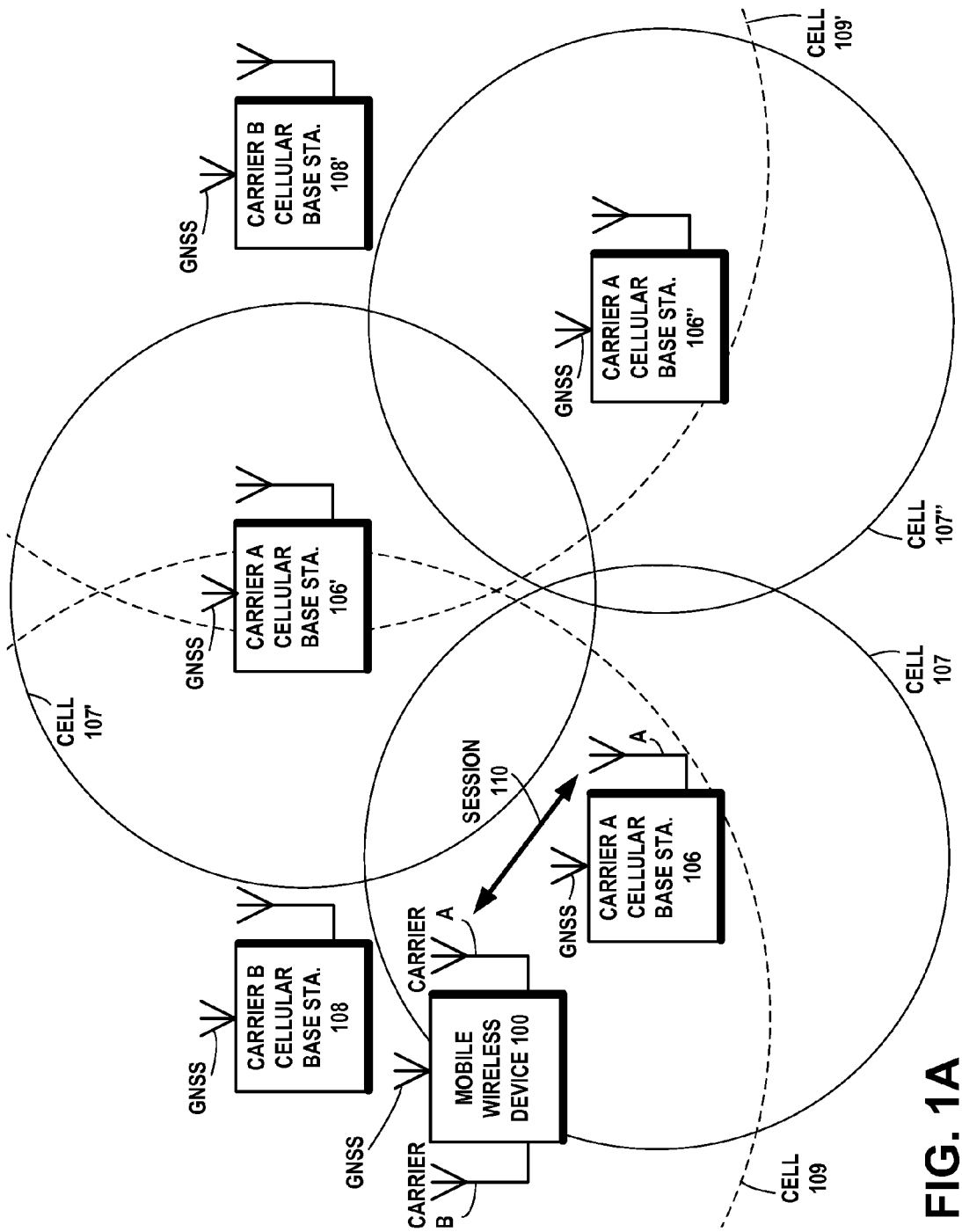
FIG. 1A illustrates an example embodiment of a multi-SIM mobile wireless device having a GNSS location detection capability, operating in a geographical area served by two different cellular carriers.

FIG. 1A illustrates an example embodiment of a multi-SIM mobile wireless device 100 having an A-GNSS location detection capability, operating in a geographical area served by two different wireless carriers A and B operating in non-overlapping portions of the radio spectrum. The wireless carriers may be cellular telephone networks using network protocols such as GERAN (GSM EDGE Radio Access Network), UTRAN (UMTS Terrestrial RAN) or WCDMA (Wide-band CDMA), E-UTRAN (Enhanced UTRAN) or LTE (Long-Term Evolution), and CDMA (Code Division Multiple Access) networks. The wireless carriers A and B may also be wireless local area networks (WLAN) using any one of the IEEE 802.11 WLAN protocols or HyperLAN protocols.

The example carriers A and B of FIG. 1 are cellular telephone networks, for example carrier A may be GERAN (GSM EDGE Radio Access Network) and carrier B may be WCDMA (Wide-band CDMA). In this example, the wireless device 100 is conducting two communications sessions. The first session 110 is within cell 107 with carrier A's cellular base station 106. The device 100 uses its first subscriber identity module (SIM) 230 and its first device modem or transceiver 208 of FIG. 2, to access the first carrier A's first base station 106. The second, simultaneous session is within cell 109 with carrier B's cellular base station 108. The device 100 uses its second subscriber identity module (SIM) 230' and its second device modem or transceiver 208' of FIG. 2, to access the second carrier B's base station 108. The wireless device 100 is able to establish its location using the A-GNSS time assistance service provided by either or both carriers A and/or B, since both the carrier A's base station 106 and the carrier B's base station 108 are able to provide the A-GNSS time assistance service. An A GNSS fix is made by the device 100 with either carrier A's base station 106 or carrier B's base station 108 and GNSS-cellular frame time relations are created for both device modems 208 and 208' of FIG. 2, using the default frame triggering functionality.

Figure 1B:
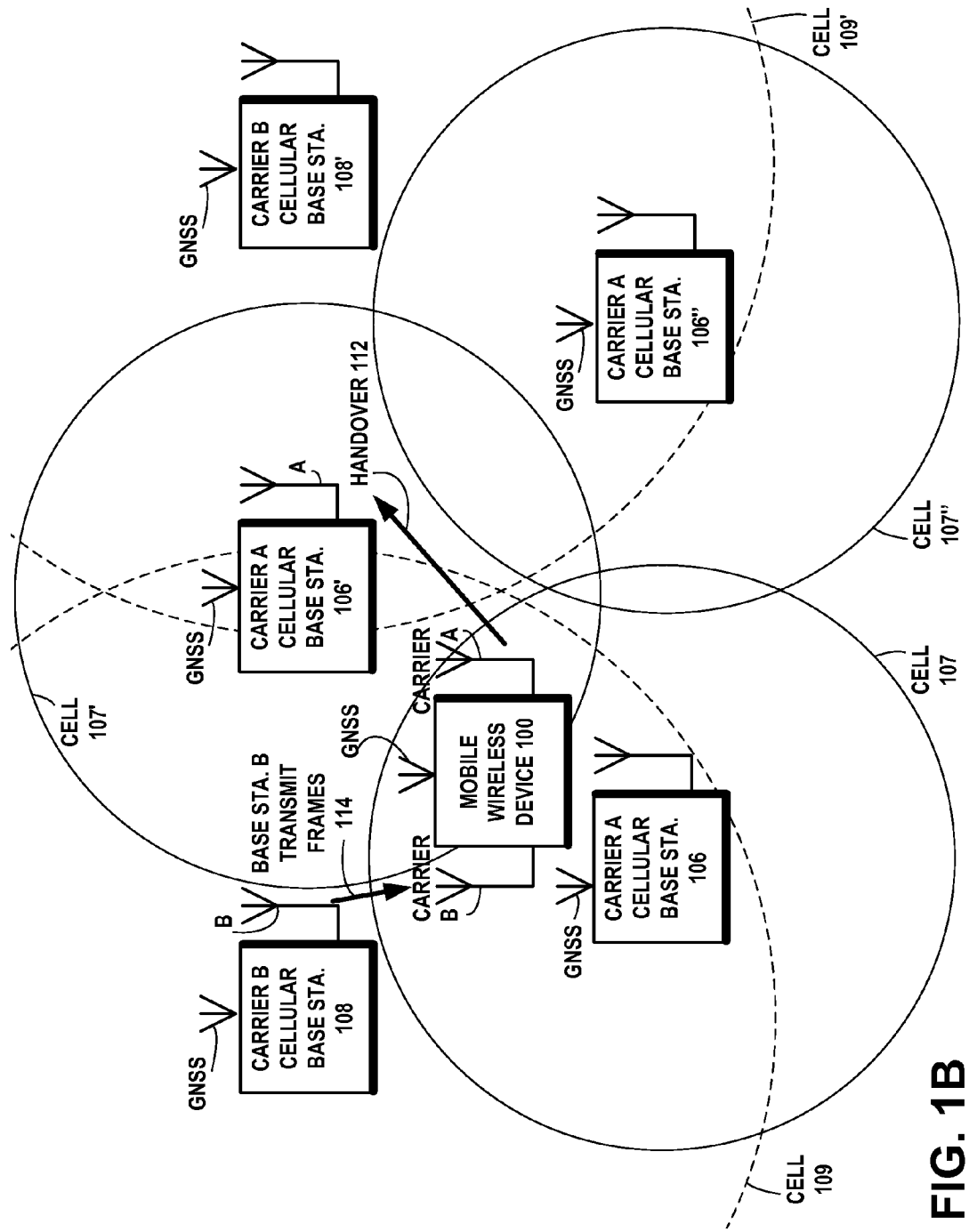
FIG. 1B illustrates the example embodiment of FIG. 1A, where the mobile wireless device has moved to a new location nearer the first carrier's (carrier A) second base station with which it performs a handover operation, the second carrier's (carrier B) base station providing cellular transmit frames to establish a time reference for an inter-modem frame trigger for the wireless device.

FIG. 1B illustrates the example embodiment of FIG. 1A, where the mobile wireless device 100 has moved to a new location into cell 107' nearer the first carrier A's second base station 106', with which it performs a handover operation 112. The wireless device 100 does not know the GNSS-cellular frame time relation for carrier A's new base station 106'. The second carrier B's base station 108 continues its existing session 114 during the handover operation 112 to carrier A's base station 106'. The second carrier B's base station 108 provides cellular transmit frames 114 to the wireless device 100 to establish a time reference for an inter-modem frame trigger 240 of FIG. 2, from the wireless device's second modem 208' for the second carrier B to its first modem 208 for the first carrier A. This makes it possible to measure the current cellular frame time difference between the first carrier A's second base station 106' and the second carrier B's base station 108, using the dual-SIMs 230 and 230', to access base stations of two different carriers.

Figure 1C:
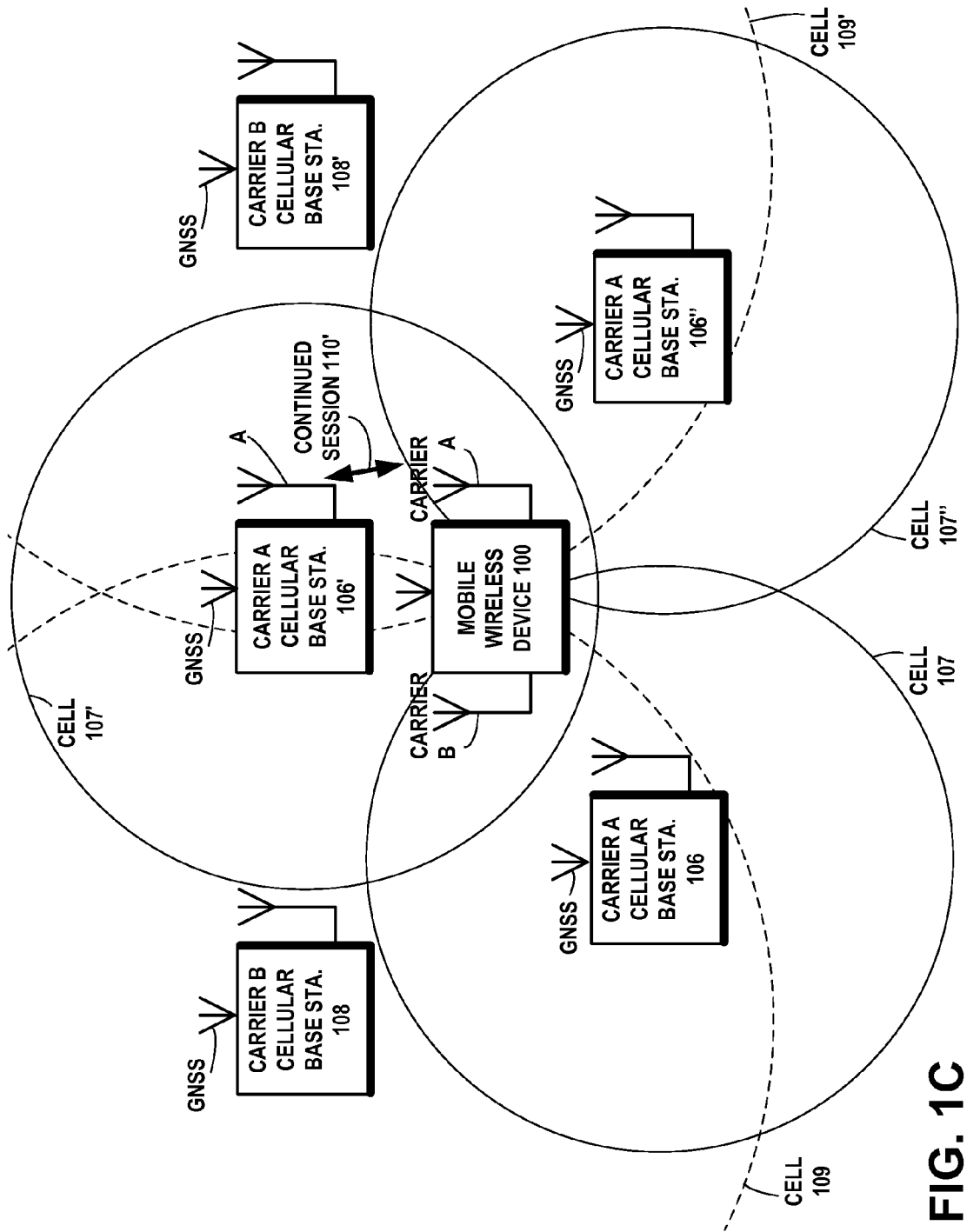
FIG. 1C illustrates the example embodiment of FIG. 1B, where the mobile wireless device has moved to a new location near the first carrier's second base station where it can continue the communications session, the GNSS-cellular frame time relation being created for he device.

FIG. 1C illustrates the example embodiment of FIG. 1B, where the mobile wireless device 100 has moved to a new location further into the cell 107' near the first carrier A's second base station 106' where it can continue the communications session 110'.

FIG. 2 illustrates a functional block diagram of an example embodiment of the wireless device 100, showing the GNSS receiver 210 and multi-SIM modem architecture 230, 230'. The wireless device 100 may be a mobile communications device, PDA, cell phone, laptop or palmtop computer, FM receiver, DVB-H receiver, Emergency Position Indicating Radiobeacon (EPIRB), wireless headset, wearable ubiquitous communications device, or the like. The wireless device 100 may also be an integrated component of a vehicle, such as an automobile, bicycle, airplane, water craft, ship, or other mobile conveyance. The wireless device 100 may be powered by a battery included in the device.

The example embodiment of the wireless device 100 is organized into two sections with a subscriber identity module (SIM) 230 or 230' and RF modem 208 and 208' in each section, to communicate with the two different carriers, A and B. The device 100 may have more than two such sections and more than two SIMs and RF modems to wirelessly communicate with more than two different carriers or with different accounts within the same carrier. One or more GNSS receivers 210 performs position determination by receiving broadcast GNSS satellite data and provides that data to the processors 215 and 215'. The subscriber identity modules (SIM) 230 or 230' provide their respective data to the processors 215 and 215'. Processors 215 and 215' each include one or more CPUs, RAM memory, and ROM memory. The RAM and ROM memories may be removable memory devices such as smart cards, Subscriber Identity Modules (SIMs), Wireless Application Protocol Identity Modules (WIMs), semiconductor memories such as a RAM, ROM, or PROM, flash memory devices, etc. Program instructions may be embodied as program logic stored in the RAM and/or ROM memories in the form of sequences of programmed instructions which may be executed in the CPUs to carry out the functions of the disclosed embodiments. Processors 215 and 215' may each include an interface INTRFC to peripheral devices such as display devices, keypads, pointer devices, speakers, earphones, microphones, headsets, still and/or video cameras, and the like.

The example embodiment of the wireless device 100 may have a cellular telephone communications protocol stack in each section, to communicate with the two different carriers, A and B. Each respective protocol stack may include one or more application programs 200 and 200', a transport layer 202 and 202', and a network layer 204 and 204'. The protocol stack for carrier A, will include a MAC layer 206 and an RF modem 208 to access and communicate with carrier A. The protocol stack for carrier B, will include a MAC layer 206' and an RF modem 208' to access and communicate with carrier B. As was discussed above for the example embodiment, the second carrier B's base station 108 provides cellular transmit frames 114 to the wireless device 100 to establish a time reference for an inter-modem frame trigger 240 of FIG. 2, from the wireless device's second modem 208' for the second carrier B to its first modem 208 for the first carrier A. This makes it possible to measure the current cellular frame time difference between the first carrier A's second base station 106' and the second carrier B's base station 108, using the dual-SIMs 230 and 230', to access base stations of two different carriers.

FIG. 3 illustrates a functional block diagram of an example embodiment of the second carrier B's base station providing cellular transmit frames 114 to the wireless device 100 to establish a time reference to measure the current cellular frame time difference between the first carrier A's second base station 106' and the second carrier's base station 108. When the wireless device 100 accesses the second carrier B's base station 108, it uses the service-subscriber key (IMSI) stored in the SIM module 230'. The IMSI is received by the RF modem 208B of the second carrier B's base station 108 and sent to the second carrier B's Home Location Register (HLR) 306B or as locally copied in the Visitor Location Register 304B. The HLR 306B database contains subscriber authorization information and the service features that are to be provided to the subscriber under the subscription plan with carrier B, including the position determination service using assisted Global Navigation Satellite Systems (A-GNSS). Similarly, when the wireless device 100 accesses the first carrier A's base station 106, it uses the service-subscriber key (IMSI) stored in the SIM module 230. The IMSI is received by the RF modem or transceiver 208A of the first carrier A's base station 106 and sent to the first carrier A's Home Location Register (HLR) 306A or as locally copied in the Visitor Location Register 304A. The HLR 306A database contains subscriber authorization information and the service features that are to be provided to the subscriber under the subscription plan with carrier A, including the position determination service using assisted Global Navigation Satellite Systems (A-GNSS).

GNSS receivers 210A and 210B respectively at base stations 106' and 108, gather GNSS data by receiving broadcast GNSS satellite data from GNSS satellites 300 and 300' and provide that data to the respective processors 305A and 305B. The example embodiment of the base stations 106' and 108 may have all or part of a cellular telephone communications protocol stack in each base station, to communicate with wireless devices such as device 100. Each base station may share parts of the protocol stack with the mobile switching center (MSC) to which it is connected. Each respective protocol stack may include a network layer 204A and 204B, which may connect to the public switched telephone network (PSTN) through respective interfaces 308A and 308B. In the example shown in FIG. 3, the protocol stack in the mobile switching center (MSC) 302A for carrier A, will include a MAC layer 206A connected to an RF modem 208A in base station 106' to communicate with the RF modem 208 in the wireless device 100. The protocol stack in the mobile switching center (MSC) 302B for carrier B, will include a MAC layer 206B connected to an RF modem or transceiver 208B in base station 108 to communicate with the RF modem 208' in the wireless device 100. As was discussed above for the example embodiment, the second carrier B's base station 108 provides cellular transmit frames 114 to the wireless device 100 to establish a time reference for an inter-modem frame trigger 240 of FIG. 2, from the wireless device's second modem 208' for the second carrier B to its first modem 208 for the first carrier A.

Example embodiments of the invention may include a wireless communications device that may have the following components.

at least a first SIM module 230 configured to access a first wireless carrier A and a second SIM module 230' configured to access a second wireless carrier B;

at least a first RF modem 208 configured to communicate with the first wireless carrier A and a second RF modem 208' configured to communicate with the second wireless carrier B;

at least one global navigation satellite system receiver 210;

at least one processor CPU;

at least one memory RAM, ROM including computer program code;

the at least one memory and the computer program code configured to, with the at least one processor, cause the wireless communications device at least to:

cause satellite signals to be received from a global navigation satellite system 300;

compute a global navigation satellite system-cellular frame time relation between the received satellite signals and cellular frame signals received by the second RF modem 208' from a base station 108 of a second cellular carrier B;

cause a handover 112 to be performed from the first base station 106 to a second base station 106' of the first cellular carrier A;

cause an inter-modem frame trigger 240 to be sent from the second RF modem 208' to the first RF modem 208, to synchronize the first RF modem 208 with the cellular frame signals received from the base station 108 of the second cellular carrier B;

compute a current global navigation satellite system-cellular frame time relation between the received satellite signals and cellular frame signals received by the first RF modem 208 from the second base station 106' of the first cellular carrier A by computing a cellular frame time difference between the base station 108 of the second cellular carrier B and the second base station 106' of the first cellular carrier A, and adding that difference to the second frame time relation of the received signals with the base station 108 of the second cellular carrier B; and determine position using the received satellite signals and the cellular frame signals received by the first RF modem 208 from the second base station 106' of the first cellular carrier A, based on the computed current global navigation satellite system-cellular frame time relation.

FIG. 4A illustrates a flow diagram of an example embodiment of the process 400 to measure the current cellular frame time difference between the first carrier's second base station and the second carrier's base station. The steps of the flow diagram represent computer code instructions stored in the RAM and/or ROM memory of the wireless device 100, which when executed by the central processing units (CPU), carry out the functions of the example embodiments of the invention. The steps may be carried out in another order than shown and individual steps may be combined or separated into component steps. The steps of the example method 400 are as follows.

Step 402: wireless device modem_A is connected to carrier_A cell 106 and wireless device modem_B is connected to carrier_B cell 108 (FIG. 1a)

Step 404: a GNSS fix is made by the device and GNSS-cellular frame time relations are created for both device modems (for carrier_A cell 106 and carrier_B cell 108) using the "default frame triggering" functionality. In an alternate example embodiment of step 404, one default frame trigger may be made and then one inter modem frame trigger can create the relation for both cells.

Step 406: wireless device GNSS is powered off

Step 408: modem_A now does a handover to carrier_A new cell 106', whose GNSS-cellular frame time relation is not known. Modem_B is still connected to carrier_B cell 108. (FIG. 1b).

Step 410: an inter-modem frame trigger 140 is done directly from device modem_B to modem_A, making it possible to measure current cellular frame time difference between carrier_B cell 108 and carrier_A new cell 106' within the device dual/multi-SIM modem.

Step 412: the GNSS-cellular frame time relation can now be created for carrier_A new cell 106' by adding the cellular frame time difference between carrier_B cell 108 and carrier_A new cell 106' to the existing GNSS-cellular frame time relation for the carrier_B cell 108. There is no need to power on the GNSS. (FIG. 1c)

Step 414: if the timing advance or similar information is available about the distance of the device from the serving base station, that information can be used to further enhance the quality of the cellular frame time difference.

FIG. 4B illustrates a flow diagram of an example embodiment of the process 420 to execute frame triggering by the GNSS receiver for both modems. The steps of the flow diagram represent computer code instructions stored in the RAM and/or ROM memory of the wireless device 100, which when executed by the central processing units (CPU), carry out the functions of the example embodiments of the invention. The steps may be carried out in another order than shown and individual steps may be combined or separated into component steps. The steps of the example method 420 are as follows.

Steps 402 to 408 are the same as in FIG. 4a, with wireless device modem_A doing a handover to carrier_A new cell 106'. In this example case, the default frame trigger may be used for both modems.

Step 422: wireless device GNSS is powered on.

Step 424: wireless device modem_A and modem_B are both commanded to execute frame triggering towards the GNSS receiver. Frame triggering from the both modems should happen as simultaneously as possible to minimize the crystal oscillator drift.

Step 426: the cellular frame time difference between carrier_B cell 108 and carrier_A new cell 106' is measured from the time difference between the hardware pulses received at the device GNSS receiver. No GNSS fixes are required.

Step 428: the GNSS-cellular frame time relation can now be created for carrier_A new cell 106' by adding the measured cellular frame time difference between carrier_B cell 108 and carrier_A new cell 106' to the existing GNSS-cellular frame time relation for the carrier_B cell 108. If the timing advance or similar info is available about the distance of the device from the serving base station, that information can be used to further enhance the quality of the cellular frame time difference.

Step 430: wireless device GNSS is powered off.

Figure 4C:
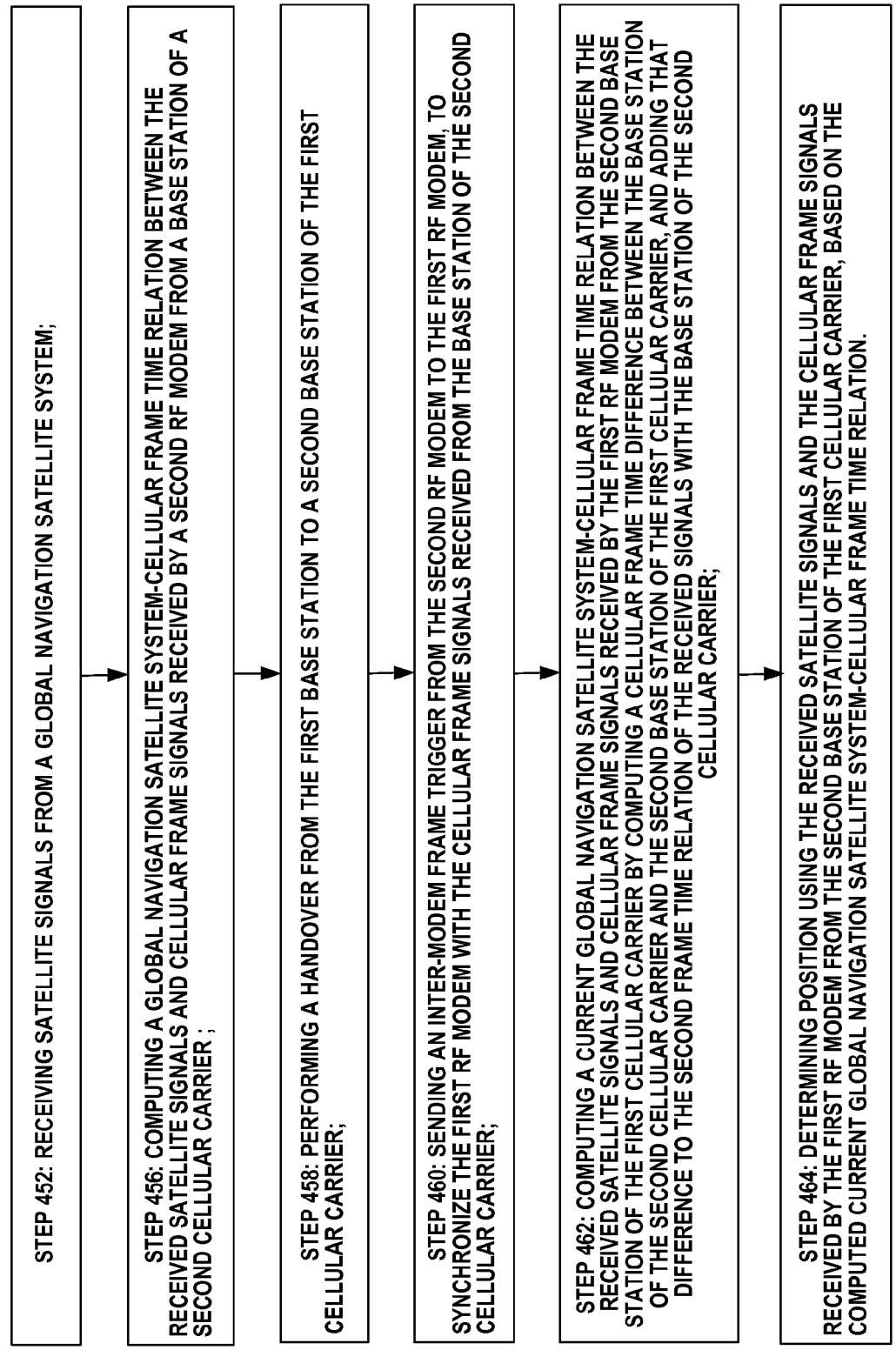
FIG. 4C illustrates a flow diagram of an example embodiment of the process to measure the current cellular frame time difference between the first carrier's second base station and the second carrier's base station.

FIG. 4C illustrates a flow diagram of an example embodiment of the process 450 to execute frame triggering by the GNSS receiver for both modems. The steps of the flow diagram represent computer code instructions stored in the RAM and/or ROM memory of the wireless device 100, which when executed by the central processing units (CPU), carry out the functions of the example embodiments of the invention. The steps may be carried out in another order than shown and individual steps may be combined or separated into component steps. The steps of the example method 450 are as follows.

Step 452: receiving satellite signals from a global navigation satellite system;

Step 456: computing a global navigation satellite system-cellular frame time relation between the received satellite signals and cellular frame signals received by a second RF modem from a base station of a second cellular carrier;

Step 458: performing a handover from the first base station to a second base station of the first cellular carrier;

Step 460: sending an inter-modem frame trigger from the second RF modem to the first RF modem, to synchronize the first RF modem with the cellular frame signals received from the base station of the second cellular carrier;

Step 462: computing a current global navigation satellite system-cellular frame time relation between the received satellite signals and cellular frame signals received by the first RF modem from the second base station of the first cellular carrier by computing a cellular frame time difference between the base station of the second cellular carrier and the second base station of the first cellular carrier, and adding that difference to the second frame time relation of the received signals with the base station of the second cellular carrier; and Step 464: determining position using the received satellite signals and the cellular frame signals received by the first RF modem from the second base station of the first cellular carrier, based on the computed current global navigation satellite system-cellular frame time relation.

Figure 5:
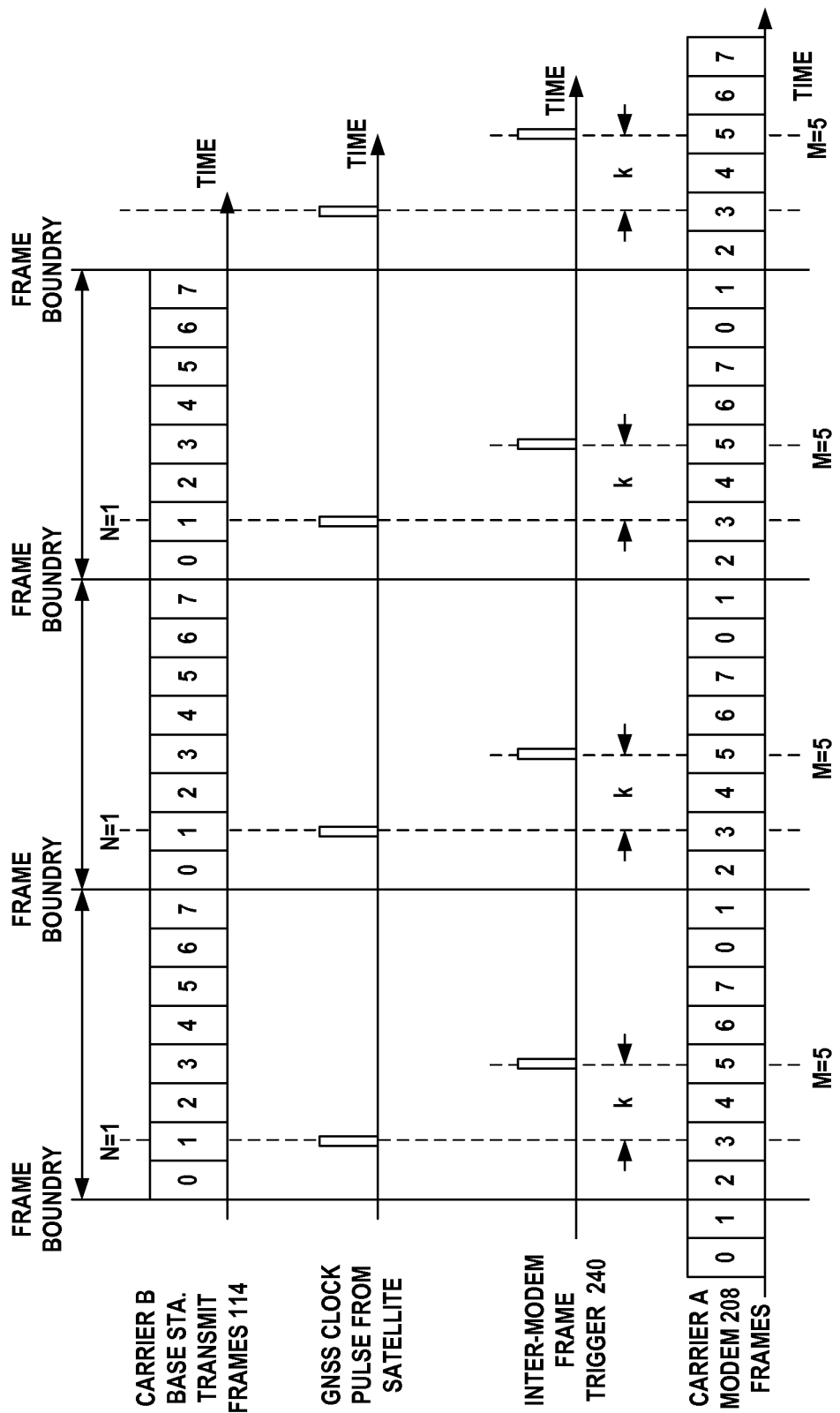
FIG. 5 illustrates a timing diagram of an example embodiment for generating the inter-modem trigger.

FIG. 5 illustrates a timing diagram for an example embodiment of generating the inter-modem trigger 240 in the wireless device of FIG. 2, having two RF modems. Base station B's transmit frames 114 occur periodically on frame boundaries. In this example, the inter-modem trigger 240 is generated by RF modem 208' at an instant displaced from the frame boundaries by a constant interval "k". FIG. 5 shows the relative timing of the carrier B's transmit frames 114, GNSS time at frame boundary, the inter-modem frame trigger 240, and the frames of carrier A at the modem 208.

In this example embodiment, the GNSS time may be calculated as follows:

1) The RF modem 208' for carrier B (RF1) creates the reference frame time relation to GNSS time at FrameNumber N:

RF1_time(N)@GNSS_time.

2) The RF modem 208 for carrier A (RF2) moves to a new cell.

3) RF1 makes a inter-modem trigger (FT) at FrameNumber N+k and that is received at RF2 at FrameNumber M:

RF1_time(N+k)@RF2_time(M).

4) The GNSS time at FrameNumber M can be now calculated for RF2 as

RF2_time(M)@GNSS_time=
RF1_time(N)@GNSS_time+(RF1_time(N+k)−RF1_time(N))

In other example embodiments, the frame trigger may be made on the frame boundary. In still other example embodiments, the trigger pulses may be generated at other locations in the frames.

Figure 6:
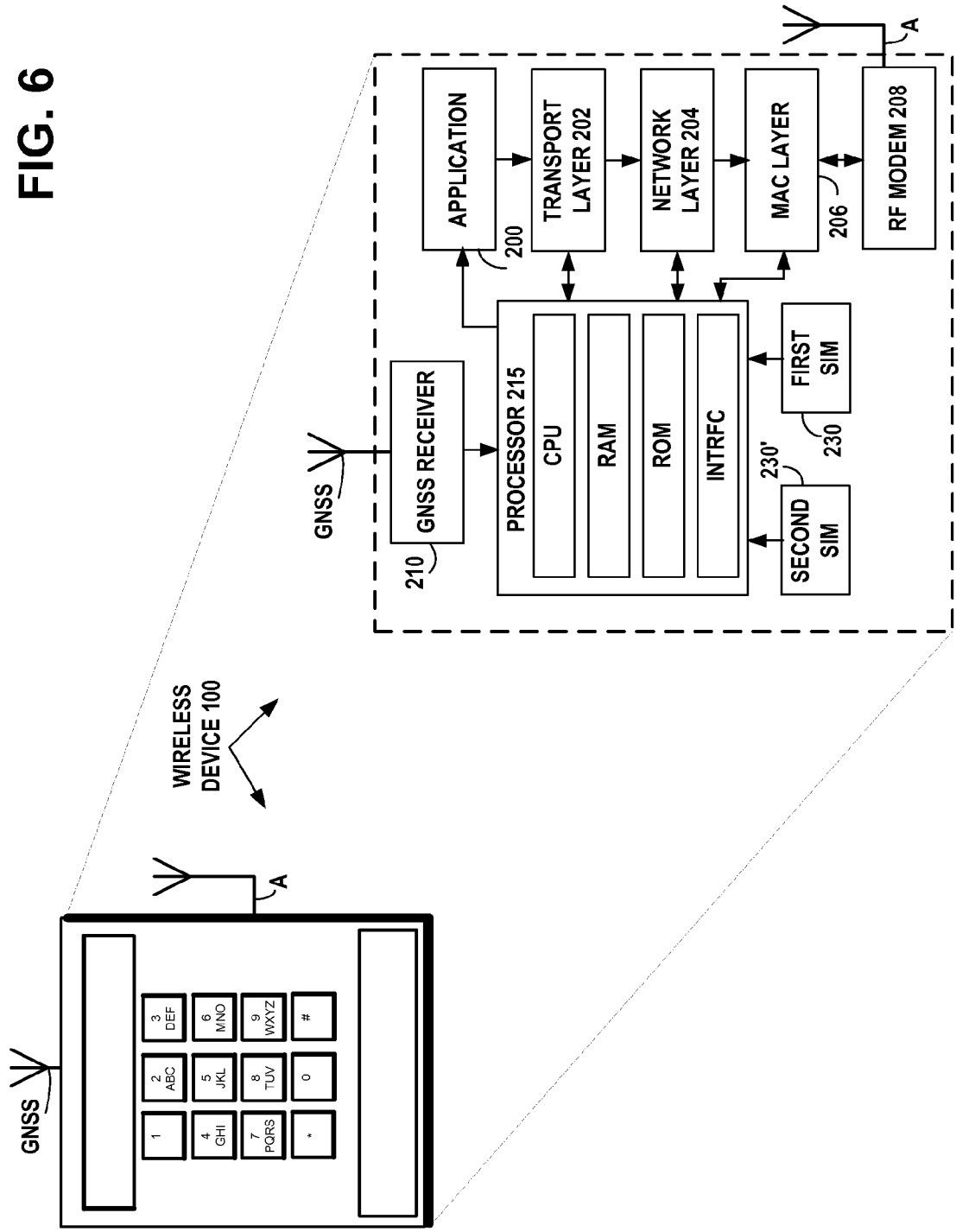
FIG. 6 illustrates a functional block diagram of another example embodiment of a multi-SIM mobile wireless device having an A-GNSS location detection capability, with a single RF modem that may communicate with the two or more carriers that use communication protocols that are compatible with the RF modem.

FIG. 6 illustrates a functional block diagram of another example embodiment of a multi-SIM mobile wireless device 100 having an A-GNSS location detection capability, operating in a geographical area served by two or more different cellular wireless carriers operating in non-overlapping portions of the radio spectrum. The wireless device 100 of FIG. 6 has a single RF modem 208 that may communicate with the two or more carriers that use communication protocols that are compatible with the RF modem 208. For example, the two or more carriers may be cellular telephone networks using network a protocol such as GERAN (GSM EDGE Radio Access Network) operating in non-overlapping portions of the radio spectrum. The wireless two or more carriers may also be wireless local area networks (WLAN) using any one of the IEEE 802.11 WLAN protocols or HyperLAN protocols.

The example wireless device 100 of FIG. 6 includes two subscriber identity modules (SIM) 230 and 230' to use to communicate with the two or more carriers. The device 100 may have more than two SIMs to wirelessly communicate with more than two different carriers or with different accounts within the same carrier. One or more GNSS receivers 210 performs position determination by receiving broadcast GNSS satellite data and provides that data to the processor 215. The subscriber identity modules (SIM) 230 or 230' provide their respective data to the processor 215. Processor 215 includes one or more CPUs, RAM memory, and ROM memory. Program instructions may be embodied as program logic stored in the RAM and/or ROM memories in the form of sequences of programmed instructions which may be executed in the CPUs to carry out the functions of the disclosed embodiments. Processor 215 may include an interface INTRFC to peripheral devices such as display devices, keypads, pointer devices, speakers, earphones, microphones, headsets, still and/or video cameras, and the like.

The example embodiment of the wireless device 100 of FIG. 6 may have a cellular telephone communications protocol stack to communicate with the two or more carriers. Each protocol stack may include one or more application programs 200, a transport layer 202, and a network layer 204. The protocol stack will include a MAC layer 206 and an RF modem 208 access and communicate with the two or more carriers. Either one or both of the carrier's base stations provides cellular transmit frames to the wireless device 100 to establish a time reference for switching between the first SIM 230 and the second SIM 230' to access base stations of the two or more carriers. The GNSS clock, for example, may be used as a time base for switching between the first SIM 230 and the second SIM 230'.

For example, the first carrier's base station sends cellular transmit frames to the single RF modem 208 of the wireless device 100 of FIG. 6, using the first SIM 230. The processor 215 in FIG. 6 creates a reference frame time relation between the first carrier's base station and GNSS time at FrameNumber N. To transfer the GNSS time for use by the second SIM in communicating through the single RF modem 208 with the second carrier's base station, the processor 215 generates a trigger (FT) at FrameNumber N+k and associates it with FrameNumber M of the second carrier's base station. The GNSS time at FrameNumber M can be now calculated for the second carrier's base station, in a manner similar to that described above for the dual RF modem embodiment of FIG. 2. This makes it possible to measure the current cellular frame time difference between the first carriers base station and the second carrier's base station, using the dual-SIMs 230 and 230' of FIG. 6, to access base stations of two different carriers with the same RF modem 208.

FIG. 4D is an example flow diagram 470 illustrating the operation of the multi-SIM mobile wireless device 100 of FIG. 6, comprising the following steps:

Step 472: receiving first assisted global navigation satellite system wireless signals by at least one RF modem from a first wireless carrier using a first SIM module;

Step 474: receiving second assisted global navigation satellite system wireless signals by the at least one RF modem from a second wireless carrier using a second SIM module; and Step 476: causing the at least one RF module to periodically switch between using the first SIM module and using the second SIM module to periodically switch between receiving first assisted global navigation satellite system wireless signals from the first carrier or receiving second assisted global navigation satellite system wireless signals from the second carrier.

The resulting embodiments to improve the speed and sensitivity of position determination by wireless communication devices using assisted Global Navigation Satellite Systems (A-GNSS).

The program instructions implementing the flow diagrams 400, 420, and 450 of FIGS. 4A, 4B, and 4C respectively, may be embodied as program logic stored in the RAM and/or ROM in the form of sequences of programmed instructions which may be executed in the one or more CPUs, to carry out the functions of the disclosed embodiments. The program logic may be delivered to the writeable RAM, ROM, PROM, flash memory device, etc. of the apparatus from a computer program product or article of manufacture in the form of computer-usable media such as resident memory devices, smart cards or other removable memory devices. Alternately, the program instructions implementing the flow diagrams 400, 420, and 450 may be embodied as integrated circuit logic in the form of programmed logic arrays or custom designed application specific integrated circuits (ASIC).

Using the description provided herein, the embodiments may be implemented as a machine, process, or article of manufacture by using standard programming and/or engineering techniques to produce programming software, firmware, hardware or any combination thereof.

Any resulting program, having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that is stored permanently or temporarily on any computer-usable medium.

Although specific example embodiments have been disclosed, a person skilled in the art will understand that changes can be made to the specific example embodiments without departing from the spirit and scope of the invention.

What is claimed is:

1. An apparatus, comprising: at least a first SIM module configured to access a first wireless carrier and a second SIM module configured to access a second wireless carrier; at least a first RF modem configured to communicate with the first wireless carrier and a second RF modem configured to communicate with the second wireless carrier; at least one global navigation satellite system receiver; at least one processor; at least one memory including computer program code; the at least one memory and the computer program code configured to, with the at least one processor, cause the apparatus at least to: compute a reference global navigation satellite system-cellular frame time relation between received satellite signals and cellular frame signals received by the second RF modem from a base station of the second wireless carrier; cause a handover to be performed from a first base station to a second base station of the first wireless carrier; cause an inter-modem frame trigger to be sent from the second RF modem to the first RF modem, to synchronize the first RF modem with the cellular frame signals received from the base station of the second wireless carrier; compute a current global navigation satellite system-cellular frame time relation between the received satellite signals and cellular frame signals received by the first RF modem from the second base station of the first wireless carrier by computing a cellular frame time difference between the base station of the second wireless carrier and the second base station of the first wireless carrier, and adding that difference to the reference frame time relation of the received satellite signals with the base station of the second wireless carrier; and determine position using the received satellite signals and the cellular frame signals received by the first RF modem from the second base station of the first wireless carrier, based on the computed current global navigation satellite system-cellular frame time relation.

2. The apparatus of claim 1, wherein the first and second wireless carriers are cellular telephone carriers.

3. The apparatus of claim 1, wherein the first and second wireless carriers are wireless local area networks using an IEEE 802.11 protocol or a HyperLAN protocol.

4. The apparatus of claim 1, further comprising: the at least one memory and the computer program code configured to, with the at least one processor, cause the apparatus at least to: cause satellite signals to be received from a global navigation satellite system.

5. A method, comprising: receiving first assisted global navigation satellite system signals from a first wireless carrier using a first SIM module and a first RF modem; receiving second assisted global navigation satellite system signals from a second wireless carrier using a second SIM module and a second RF modem; computing a reference global navigation satellite system-cellular frame time relation between received satellite signals and cellular frame signals received by the second RF modem from a base station of the second wireless carrier; causing a handover to be performed from a first base station to a second base station of the first wireless carrier; causing an inter-modem frame trigger to be sent from the second RF modem to the first RF modem, to synchronize the first RF modem with the cellular frame signals received from the base station of the second wireless carrier; computing a current global navigation satellite system-cellular frame time relation between the received satellite signals and cellular frame signals received by the first RF modem from the second base station of the first wireless carrier by computing a cellular frame time difference between the base station of the second wireless carrier and the second base station of the first wireless carrier, and adding that difference to the reference frame time relation of the received satellite signals with the base station of the second wireless carrier; and determining position using the received satellite signals and the cellular frame signals received by the first RF modem from the second base station of the first wireless carrier, based on the computed current global navigation satellite system-cellular frame time relation.

6. The method of claim 5, wherein the first and second wireless carriers are cellular telephone carriers.

7. The method of claim 5, wherein the first and second wireless carriers are wireless local area networks using an IEEE 802.11 protocol or a HyperLAN protocol.

8. The method of claim 5, further comprising: causing satellite signals to be received from a global navigation satellite system.

9. A method, comprising: computing a reference global navigation satellite system-cellular frame time relation between received satellite signals and cellular frame signals received by a second RF modem from a base station of a second cellular carrier; performing a handover from a first base station to a second base station of a first cellular carrier; sending an inter-modem frame trigger from the second RF modem to a first RF modem, to synchronize the first RF modem with the cellular frame signals received from the base station of the second cellular carrier; computing a current global navigation satellite system-cellular frame time relation between the received satellite signals and cellular frame signals received by the first RF modem from the second base station of the first cellular carrier by computing a cellular frame time difference between the base station of the second cellular carrier and the second base station of the first cellular carrier, and adding that difference to the reference frame time relation of the received satellite signals with the base station of the second cellular carrier; and determining position using the received satellite signals and the cellular frame signals received by the first RF modem from the second base station of the first cellular carrier, based on the computed current global navigation satellite system-cellular frame time relation.

10. A non-transitory computer readable medium storing program instructions, which when executed by a computer processor, performing the method of: receiving first assisted global navigation satellite system signals from a first wireless carrier using a first SIM module and a first RF modem; receiving second assisted global navigation satellite system signals from a second wireless carrier using a second SIM module and a second RF modem; computing a reference global navigation satellite system-cellular frame time relation between received satellite signals and cellular frame signals received by the second RF modem from a base station of the second wireless carrier; causing a handover to be performed from a first base station to a second base station of the first wireless carrier; causing an inter-modem frame trigger to be sent from the second RF modem to the first RF modem, to synchronize the first RF modem with the cellular frame signals received from the base station of the second wireless carrier; computing a current global navigation satellite system-cellular frame time relation between the received satellite signals and cellular frame signals received by the first RF modem from the second base station of the first wireless carrier by computing a cellular frame time difference between the base station of the second wireless carrier and the second base station of the first wireless carrier, and adding that difference to the reference frame time relation of the received satellite signals with the base station of the second wireless carrier; and determining position using the received satellite signals and the cellular frame signals received by the first RF modem from the second base station of the first wireless carrier, based on the computed current global navigation satellite system-cellular frame time relation.

11. A non-transitory computer readable medium storing program instructions, which when executed by a computer processor, performing the method of: computing a reference global navigation satellite system-cellular frame time relation between received satellite signals and cellular frame signals received by a second RF modem from a base station of a second cellular carrier; performing a handover from the first base station to a second base station of the first cellular carrier; sending an inter-modem frame trigger from the second RF modem to the first RF modem, to synchronize the first RF modem with the cellular frame signals received from the base station of the second cellular carrier; computing a current global navigation satellite system-cellular frame time relation between the received satellite signals and cellular frame signals received by the first RF modem from the second base station of the first cellular carrier by computing a cellular frame time difference between the base station of the second cellular carrier and the second base station of the first cellular carrier, and adding that difference to the reference frame time relation of the received satellite signals with the base station of the second cellular carrier; and determining position using the received satellite signals and the cellular frame signals received by the first RF modem from the second base station of the first cellular carrier, based on the computed current global navigation satellite system-cellular frame time relation.

12. An apparatus, comprising: means for computing a reference global navigation satellite system-cellular frame time relation between received satellite signals and cellular frame signals received by a second RF modem from a base station of a second cellular carrier; means for performing a handover from the first base station to a second base station of the first cellular carrier; means for sending an inter-modem frame trigger from the second RF modem to the first RF modem, to synchronize the first RF modem with the cellular frame signals received from the base station of the second cellular carrier; means for computing a current global navigation satellite system-cellular frame time relation between the received satellite signals and cellular frame signals received by the first RF modem from the second base station of the first cellular carrier by computing a cellular frame time difference between the base station of the second cellular carrier and the second base station of the first cellular carrier, and adding that difference to the reference frame time relation of the received satellite signals with the base station of the second cellular carrier; and means for determining position using the received satellite signals and the cellular frame signals received by the first RF modem from the second base station of the first cellular carrier, based on the computed current global navigation satellite system-cellular frame time relation.

* * * * *